June 2, 1931. H. D. GEYER 1,807,657
MOLDED STEERING WHEEL
Filed Sept. 22, 1928  2 Sheets-Sheet 1
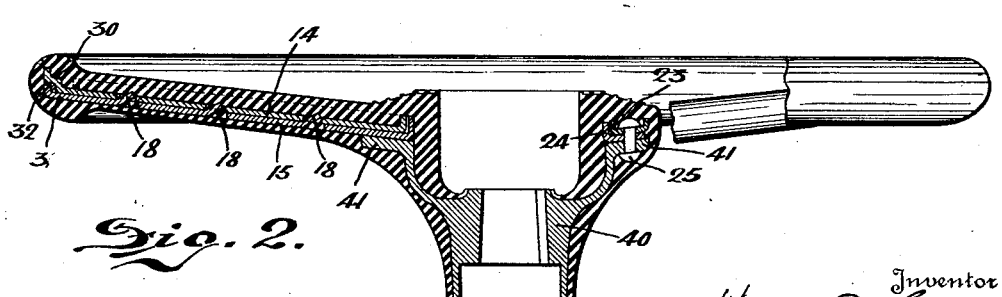

June 2, 1931.   H. D. GEYER   1,807,657
MOLDED STEERING WHEEL
Filed Sept. 22, 1928   2 Sheets-Sheet 2
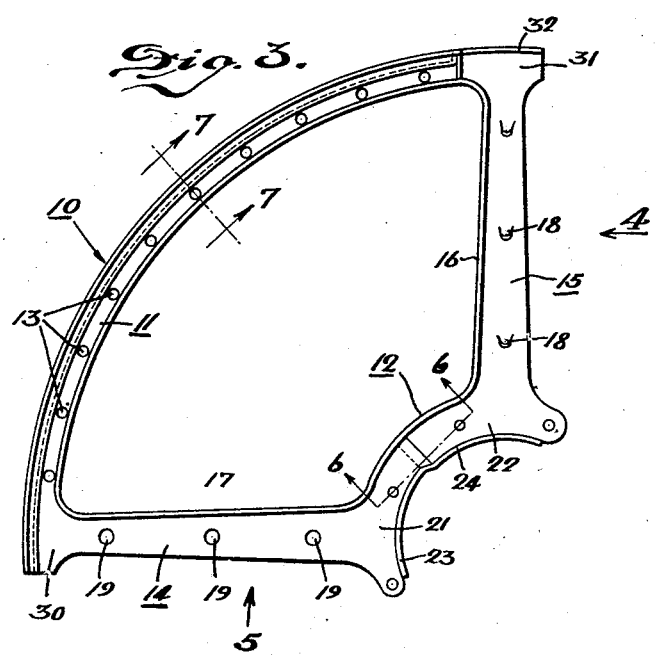
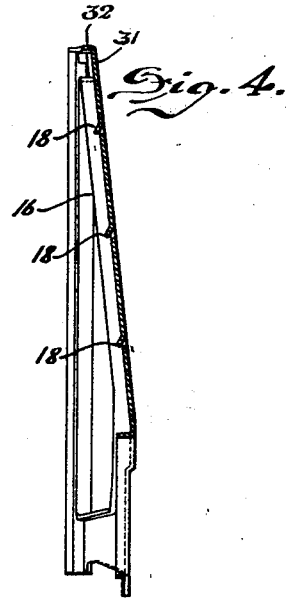
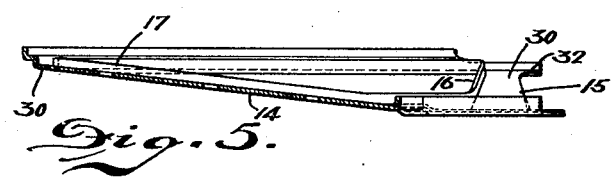
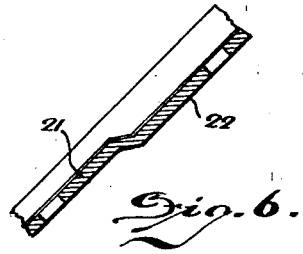
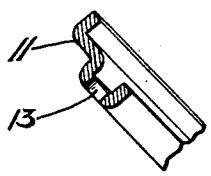
Inventor
Harvey D. Geyer
By Spencer Hardman & Fehr
his Attorneys Patented June 2, 1931

1,807,657

UNITED STATES PATENT OFFICE

HARVEY D. GEYER, OF DAYTON, OHIO, ASSIGNOR TO INLAND MANUFACTURING COMPANY, OF DAYTON, OHIO, A CORPORATION OF DELAWARE

MOLDED STEERING WHEEL

Application filed September 22, 1928. Serial No. 307,695.

This invention relates to handwheels especially such as are used as steering wheels on automotive vehicles.

An object of this invention is to provide a built-up rigid pressed metal reinforcing skeleton for molded composition handwheels.

A more specific object is to provide such a pressed metal skeleton built up from separately formed segments and rigidly secured together in overlapping relation, whereby to produce spokes of double thickness while the rim portion of the skeleton is of single thickness except at the points where the spokes join the rim. This construction also permits the utilization of smaller pieces of flat stock than where the entire skeleton is formed integrally from a single piece of stock.

Further objects and advantages of the present invention will be apparent from the following description, reference being had to the accompanying drawings wherein a preferred embodiment of one form of the present invention is clearly shown.

In the drawings:

Fig. 1 is a plan view of an automobile steering wheel built according to this invention, certain portions of the molded material being broken away to show the reinforcing metal skeleton.

Fig. 2 is a section on line 2—2 of Fig. 1.

Fig. 3 is a plan view of one of the pressed metal quadrants used in building up the metal skeleton.

Fig. 4 is a view of the quadrant looking in the direction of arrow 4 of Fig. 3.

Fig. 5 is a view of the quadrant looking in the direction of arrow 5 of Fig. 3.

Figs. 6 and 7 are views on a larger scale on lines 6—6 and 7—7 of Fig. 3.

Figs. 8 and 9 are views on a larger scale on lines 8—8 and 9—9 of Fig. 1.

Similar reference characters refer to similar parts thruout the several views.

Numeral 10 designates in its entirety one of the quadrants which is pressed from sheet steel to the form illustrated in Figs. 3 to 7. Each quadrant 10 has a rim portion 11, a hub ring portion 12, and two spoke portions 14 and 15 of slightly different form.

When the four quadrants 10 are assembled together so that the spoke portions overlap each other, all the spoke portions 15 lie underneath the spoke portions 14 of the adjacent quadrant 10 and for this reason the spoke portions 14 and 15 are of differing forms to properly internest with each other. Spokes 15 each has an upstanding stiffening flange 16 which is wider than flange 17 on spokes 14, so that when spokes 14 and 15 internest, the top edges of flanges 16 and 17 will be approximately even, as clearly shown in Figs. 8 and 9. Spokes 15 each has a series of small tongues 18 bent up from the metal thereof and into corresponding holes 19 in the overlying spokes 14 to aid in holding these spoke portions strongly fixed together, as clearly shown in Figs. 1 and 2. In addition these spoke portions are spot welded together at the four points 20 shown in Fig. 1.

In order to permit neat overlapping of the hub ring portions 12, the overlying portion 21 thereof is offset upwardly from the underlying portion 22 thereof, as shown in Fig. 6, and likewise the inner flange 23 on portion 21 is offset radially from the flange 24 on portion 22 (see Fig. 3) to permit neat internesting of these flanges, as shown in the cut away part of Fig. 1. It will be clear from viewing Figs. 1 and 3 that the hub ring portions 21 overlap the portions 22 sufficiently so that they are riveted together by both the rivets 25 at each overlap. The relatively wide spacing of these rivets 25 obviously gives a very strong and rigid construction.

The rim portions 11 overlap for a short distance at the outer ends of the spokes. The section of the rim is clearly shown in Fig. 7, but this section must be modified somewhat at the spoke ends so that the overlying portion 30 will internest properly with the underlying portion 31. Therefore, the underlying portion 31 is made flat except for the small upstanding flange 32 which abuts against the shoulder on the under side of the overlying portion 30, as clearly shown in Fig. 2.

A cast metal hub 40 has an annular flange 41 thereon which fits snugly against the lower surface of the hub ring 12 and is rigidly fixed thereto by the rivets 25. Thus the rivets 25 serve to fix the separate quadrants 10 together and also to fix the hub 40 in place. The hub 40 may be of any desired design, the form illustrated having a central cup adapted to receive certain controls such as horn or light switches.

The metal skeleton made as above described, is covered with a suitable molded composition body, such as molded hard rubber, to give a well appearing steering wheel having a rim and spokes of suitable section for grasping with the hand. The hard rubber is firmly bonded and anchored to the metal rim 11 by the irregular shape thereof and by flowing thru the holes 13 therein. Also in the spokes the hard rubber is anchored in place by flowing during vulcanization closely around the bent up tongues 18 in the holes 19. The hard rubber covers all exposed parts of the cast hub 40 as well as the pressed metal hub ring 12, and hence gives a very fine appearance, since the entire wheel and hub are molded integrally. The metal skeleton, made as above described, provides a very rigid wheel from comparatively light gauge sheet metal. It will be noted that all the metal spokes are of double thickness rigidly secured together, whereby rigidity and strength is concentrated, so to speak, at the points where it is most needed. The single thickness of metal in the flanged metal rim 11 is sufficient to give the desired rigidity to the wheel rim.

While the form of embodiment of the present invention as herein disclosed, constitutes a preferred form, it is to be understood that other forms might be adopted, all coming within the scope of the claims which follow.

What is claimed is as follows:

1. A handwheel comprising: four metal quadrants stamped from flat sheet metal, each having two spoke portions, a rim portion, and a hub ring portion, said quadrants overlapping along said spoke portions to form spokes of double the thickness of said sheet metal and rigidly fixed together to form a rigid wheel structure.

2. A handwheel comprising: four metal quadrants stamped from flat sheet metal, each having two spoke portions, a rim portion, and a hub ring portion, said quadrants overlying one another along said spoke portions and rigidly fixed together to form a rigid wheel structure, and a molded composition body molded upon said metal rim, spokes, and hub ring.

3. A handwheel comprising: four stamped metal quadrants, each having two spoke portions, a rim portion, and a hub ring portion, said quadrants mutually overlying one another along said spoke portions and rigidly fixed together to form a rigid wheel structure, and a cast metal hub rigidly fixed to said hub ring.

4. A molded composition handwheel having a rigid metal reinforcing structure embedded therein, said reinforcing structure comprising: a plurality of separate segments formed from flat sheet metal and each having a rim portion, hub ring portion, and two spoke portions, said segments mutually overlapping along said spoke portions and rigidly fixed together to form a rigid wheel structure.

5. A molded composition handwheel having a rigid metal reinforcing structure embedded therein, said reinforcing structure comprising: a plurality of separate segments formed from flat sheet metal and each having a rim portion, hub ring portion, and two spoke portions, said spoke portions each having a stiffening flange only along the inside edges thereof, said segments mutually overlapping along said spoke portions and rigidly fixed together whereby to form double thickness spokes having a stiffening flange on both sides thereof.

6. A molded composition handwheel having a rigid metal reinforcing structure embedded therein, said reinforcing structure comprising: a plurality of separate segments formed from flat sheet metal and each having a rim portion, hub ring portion, and two spoke portions, said segments mutually overlapping so that each segment has one of its spoke portions lying above and the other lying below corresponding spoke portions of adjacent segments.

7. A handwheel comprising: four stamped metal quadrants each having two spoke portions, a rim portion, and a hub ring portion, said quadrants mutually overlapping one another and spot welded together along said spoke portions to form a rigid wheel structure.

In testimony whereof I hereunto affix my signature.

HARVEY D. GEYER.